US00RE47435E

(19) United States
(12) Reissued Patent
Shah et al.

(10) Patent Number: US RE47,435 E
(45) Date of Reissued Patent: Jun. 11, 2019

(54) ELECTROLYTES FOR USE IN A CAPACITOR

(71) Applicant: Greatbatch Ltd., Clarence, NY (US)

(72) Inventors: Ashish Shah, East Amherst, NY (US); Christina Scheuer, Amherst, NY (US); Lauren (Miller) Matyjas, New York Mills, NY (US); Barry C. Muffoletto, Alden, NY (US)

(73) Assignee: Greatbatch Ltd., Clarence, NY (US)

(21) Appl. No.: 14/645,539

(22) Filed: Mar. 12, 2015

Related U.S. Patent Documents

Reissue of:
(64) Patent No.: 6,219,222
Issued: Apr. 17, 2001
Appl. No.: 09/384,099
Filed: Aug. 27, 1999

U.S. Applications:
(60) Provisional application No. 60/098,330, filed on Aug. 28, 1998.

(51) Int. Cl.
*H01G 9/022* (2006.01)

(52) U.S. Cl.
CPC ..... *H01G 9/022* (2013.01)

(58) Field of Classification Search
CPC ..... H01G 9/022
USPC ..... 361/504, 506
See application file for complete search history.

(56) References Cited

U.S. PATENT DOCUMENTS

| | | | | |
|---|---|---|---|---|
| 561,204 A | | 6/1896 | Curtis | |
| 3,138,746 A | | 6/1964 | Burger et al. | |
| 3,346,782 A | | 10/1967 | Alwitt et al. | |
| 3,580,845 A | | 5/1971 | Dahle | |
| 4,110,817 A | | 8/1978 | Ross et al. | |
| 4,692,224 A | | 9/1987 | Bernard et al. | |
| 4,715,976 A | * | 12/1987 | Mori et al. | 252/62.2 |
| 4,762,630 A | * | 8/1988 | Shinozaki | 252/62.2 |
| 4,830,785 A | * | 5/1989 | Shinozaki et al. | 252/62.2 |
| 5,338,472 A | * | 8/1994 | Yokoyama et al. | 525/62.2 |
| 5,369,547 A | | 11/1994 | Evans et al. | |
| 5,496,481 A | | 3/1996 | Liu | 252/62.2 |
| 5,507,966 A | | 4/1996 | Liu | 252/62.2 |
| 5,686,203 A | | 11/1997 | Idota et al. | 429/194 |
| 6,094,339 A | | 7/2000 | Evans | |
| 6,219,222 B1 | | 4/2001 | Shah et al. | |

OTHER PUBLICATIONS

"Final Written Decision", *AVX Corporation* v. *Wilson Greatbatch Ltd.* IPR2015-00101, May 2, 2016.

"Patent Owner List of Exhibits", *AVX Corporation* v. *Greatbatch, Ltd.* Case IPR2015-00101; U.S. Pat. No. 6,219,222.

(Continued)

*Primary Examiner* — Norca L. Torres Velazquez
(74) *Attorney, Agent, or Firm* — Michael F. Scalise

(57) ABSTRACT

An electrolyte for activating an electrolytic or electrochemical capacitor is described. The electrolyte preferably includes a mixed solvent of water and ethylene glycol having an ammonium salt dissolved therein. An acid such as phosphoric or acetic acid is used to provide a pH of about 3 to 6. The electrolyte is particularly useful for activating a ruthenium oxide/tantalum capacitor having an anode breakdown voltage in the range of 175 to 300 volts.

72 Claims, 5 Drawing Sheets

(56) References Cited

OTHER PUBLICATIONS

"Patent Owners Preliminary Response", *AVX Corporation* v *Wilson Greatbatch Ltd* Case IPR2015-00101; U.S. Pat. No. 6,219,222.
"Petition for Inter Parties Review of U.S. Pat. No. 6,219,222", Inventor(s): Ashish Shah, Christina Scheuer, Lauren Miller, and Barry Muffoletto, Aug. 27, 1999.
EX2002, "Definition of Feedthrough", InfoPlease, Jul. 29, 2014.
EX2003, "Definition of Feedthrough", Dictionary.com, Jul. 29, 2003.
EX2004, "Definition of Feedthrough", Yahoo, Jul. 29, 2014.
Exhibit-1009, "Prosecution History of U.S. Appl. No. 09/384,099".
Exhibit-1010, "U.S. Appl. No. 09/384,099", Aug. 28, 1998.
Exhibit-1011, "Declaration of Jan Petrzilek, Ph.D.", Aug. 27, 1999.
Exhibit-1012, "Curriculum Vitae of Jan Petrzilek, Ph.D.", Aug. 27, 1999.
"Institution Decision", *AVX Corporation* v. *Greatbatch Ltd.* IPR2015-00101, May 8, 2015.
"Notice of Filing Date Accorded to Petition and Time for Filing Patent Owner Preliminary Response", *AVX Corporation* v. *Greatbatch Ltd.* IPR2015-00101, Nov. 20, 2014.
"Patent Owners Mandatory Notices—Related Matters", *AVX Corporation* v. *Greatbatch Ltd.* IPR2015-00101, Nov. 10, 2014.
"Petitioner's Power of Attorney", *AVX Corporation* v. *Greatbatch Ltd.* IPR2015-00101, Oct. 21, 2014.
"Power of Attorney", *AVX Corporation* v. *Greatbatch Ltd.* IPR2015-00101, Nov. 10, 2014.
"Power of Attorney", *AVX Corporation* v. *Greatbatch Ltd.* IPR2015-00101, Feb. 13, 2015.
"Scheduling Order", *AVX Corporation* v. *Greatbatch Ltd.* IPR2015-00101, May 8, 2015.
Exhibit 2002, "Definition of Present, MacMillan Dictionary", *AVX Corporation* v. *Greatbatch Ltd* IPR2015-00101, Feb. 19, 2015.
Exhibit 2003, "Definition, Is Present, from WordNet", *AVX Corporation* v. *Greatbatch Ltd.* IPR2015-00101, Feb. 19, 2015.
Exhibit 2004, "Smallwood, Solvent Recovery Handbook, ISBN 9780849316029", *AVX Corporation* v. *Greatbatch Ltd.* IPR2015-00101, Feb. 19, 2015, 9.

* cited by examiner

ELECTROLYTES FOR USE IN A CAPACITOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED [APPLICATION] *APPLICATIONS*

The present application *is a reissue of U.S. application Ser. No. 09/384,099, filed on Aug. 27, 1999, now U.S. Pat. No. 6,219,222, which* claims priority based on *U.S.* provisional application Ser. No. 60/098,330, filed *on* Aug. 28, 1998[, now abandoned].

BACKGROUND OF THE INVENTION

The present invention generally relates to the conversion of chemical energy to electrical energy and, more particularly, to an electrolyte solution having high conductivity and high breakdown voltage.

SUMMARY OF THE INVENTION

The present invention relates to an electrolyte suitable for activating an electrolytic or electrochemical capacitor. The electrolyte has a solvent which includes water and ethylene glycol having an ammonium salt dissolved therein. An acid or acids is used as an additive to achieve the appropriate pH, conductivity, and breakdown voltage for a particular capacitor application.

An exemplary capacitor includes an anode of a base metal such as aluminum or tantalum provided with an oxidized surface. The oxidized anode surface is a dielectric layer typically formed by an anodizing process. The thusly formed anode is electrochemically associated with a cathode having a separator disposed there between and activated with the present electrolyte. The electrolyte has a relatively high conductivity and breakdown voltage, which ensures that the capacitor exhibits low series resistance.

These and other aspects and advantages of the present invention will become increasingly more apparent to those skilled in the art by reference to the following description and the accompanying drawings.

DETAILED DESCRIPTION OF THE PREFERRED EMBODIMENTS

Figure 1:
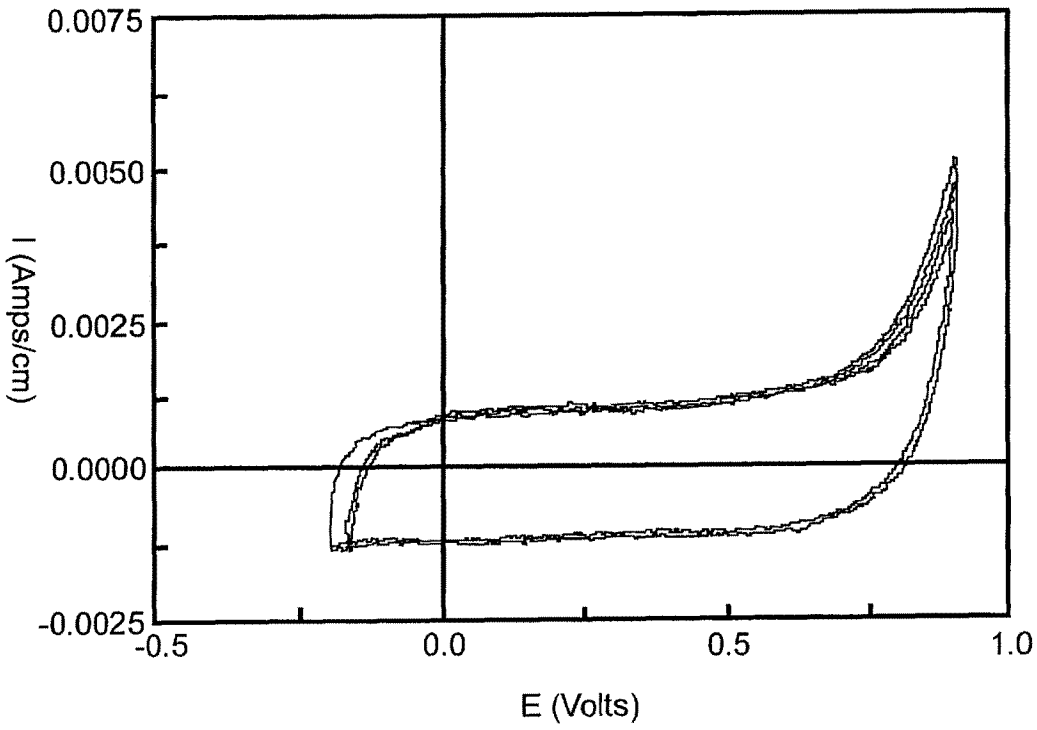
FIGS. 1 to 5 are the cyclic voltammetry scans of various electrolytes according to the present invention.

An electrolyte according to the present invention preferably contains the following ingredients, by weight: 0% to 85% de-ionized water, 0% to 95% ethylene glycol, 0% to 80% acetic acid, 0% to 6% phosphoric acid and 0% to 50% ammonium acetate. Suitable substitutes or co-solvents for the solvent ingredients of water and ethylene glycol are polyethylene glycol, formamide, dimethyl formamide and γ-butyrolactone. Ammonium acetate can be substituted by ammonium formate, ammonium hydrogen maleate and ammonium hydrogen phosphate. Besides phosphoric acid, citric, oxalic, formic, maleic, malonic, malic, sulfuric, adipic, succinic and nitric acids are also useful in the electrolyte.

The present electrolyte is compatible with components and materials used in many electrical storage devices including electrolytic and electrochemical capacitors. These types of capacitors include a cathode of a conductive metal such as titanium or tantalum provided with a semiconductive or pseudocapacitive coating. The coating can be an oxide, nitride, carbide or carbon nitride. A preferred cathode electrode is comprised of a porous ruthenium oxide film provided on a titanium substrate. The anode is of a valve metal consisting of the group vanadium, niobium and tantalum. The preferred anode is of sintered tantalum. The cathode and anode electrodes are segregated from each other by a suitable separator material. Such a capacitor is described in U.S. Pat. Nos. 5,894,403, 5,920,455 and 5,926,362. These patents are assigned to the assignee of the present invention and incorporated herein by reference.

The preferred ruthenium oxide/tantalum capacitor is useful at relatively high voltages of at least 250V, such as is required when the capacitor is incorporated into an implantable medical device, for example, a cardiac defibrillator. For this type of usage, it is important that the electrolyte have a high breakdown voltage, low resistivity, low pH and a wide operating temperature range. A preferred pH is between about 1 to about 7. This is particularly true for an ethylene glycol based electrolyte such as in the present invention. An electrolyte having a pH greater than about 7 is too neutral to allow hydrogen ions to interact with the cathode material, such as the ruthenium oxide cathode material, to achieve maximum capacitance.

A suitable electrolyte according to the present invention preferably has a resistively lower than 45 Ωcm. The resistivity can only be greater than 45 Ωcm if the viscosity of the solution is relatively low, however, ethylene glycol, a primary component of the present electrolyte has a relatively high viscosity.

The electrolyte of the present invention also has a CV window of 0.70 volts or greater.

The present electrolyte has a freezing point lower than −30° C. Should the capacitor be exposed to temperatures below −30° C., whether in use or during storage, it is important that the electrolyte not freeze.

It is another characteristic of the present electrolyte that it is chemically stable at elevated temperatures as high as 85° C. This means that the electrolyte does not generate gas at that temperature. If it did, the capacitor would swell and could be destroyed. Importantly, the physical characteristics of the electrolyte including its pH and resistivity do not change significantly over time, even at elevated temperatures up to about 85° C.

The electrolyte is also useful for activating a broad range of capacitors, preferably having an operating voltage in the range of 175 volts to 250 volts. For safety reasons, a guardband is required above the 250 volt rating at which the capacitor will operate.

The following examples describe the manner and process of an electrochemical cell according to the present invention, and they set forth the best mode contemplated by the inventors of carrying out the invention, but they are not to be construed as limiting.

EXAMPLE I

One preferred embodiment according to the present invention is an electrolyte designated CAL 22C consisting of the ingredients listed in Table 1. This electrolyte is intended for use in activating a 175 volt capacitor.

TABLE 1

| Components | Wt. Percent | Amount |
|---|---|---|
| water | 49.41 | 680 (ml) |
| ethylene glycol | 19.45 | 241 (ml) |
| ammonium acetate | 15.55 | 214 (g) |
| phosphoric acid | 0.31 | 2.5 (ml) |
| acetic acid | 15.28 | 200 (ml) |

It was determined that electrolyte CAL 22C had the physical characteristics listed in Table 2.

TABLE 2

| | |
|---|---|
| pH | 4.89 |
| Conductivity | 47.5 mS/cm |
| Resistivity | 21.0 Ωcm |
| CV Window | 0.7 volts |
| Anode Breakdown | 245 volts |

In order to determine the compatibility of electrolyte CAL 22C with other typically used capacitor components, the electrolyte was filled into 22 glass bottles. Two of the bottles contained one of the nine different component materials. Two bottles contained all nine capacitor materials and two bottles served as controls and did not contain any capacitor materials. The capacitor consists of a ruthenium oxide cathode supported on a titanium cathode substrate, a tantalum oxide anode, separator materials of CELGARD 5550 and CELGARD 3501, a glass-to-metal seal consisting of a titanium ferrule enclosing ELAN 88 glass surrounding a titanium terminal pin, a polyethylene insulating ring, a MasterSil 151 elastomer material and a MasterSil 702 elastomer material.

The capacitor component materials were weighed three times prior to being placed in the appropriate bottles. Each bottle was then filled with electrolyte CAL 22C and sealed with aluminum and polytetrafluoroethylene seal caps. Eleven of the bottles were stored at 60° C. while the remaining eleven bottles were stored at 85° C. The capacitor component materials contained in the bottles were rinsed, dried and weighed on a monthly basis for three months.

There was no discoloration in any of the electrolyte samples after storing at 60° C. and 85° C. for three months.

The polyethylene insulation ring turned beige in the sample stored at 85° C.

Most electrolyte samples had less than one percent weight change with the exception of the CELGARD and MasterSil materials. The observed weight loss was attributed to the rinsing and drying process.

It was determined that electrolyte CAL 22C is compatible with the capacitor. The significant weight loss noted in the separator material was determined to be caused by the rinsing process.

EXAMPLE II

In order to determine the effect various temperatures have on the physical properties of electrolyte CAL 22C, the electrolyte was filled into eight glass bottles. Specifically, four glass bottles were filled with electrolyte CAL 22C and stored at −35° C., 37° C., 60° C. and 85° C., respectively. The samples were tested on a monthly basis for three months for pH, conductivity, voltage breakdown, voltage window and discoloration.

The remaining four glass bottles were filled with electrolyte CAL 22C and pieces of one of the capacitor component materials were placed in respective ones of the bottles. The samples were stored at −35° C., 37° C., 60° C. and 85° C. and tested on a monthly basis for pH, conductivity, voltage breakdown, voltage window and discoloration.

There was no discoloration in the samples stored at −35° C., 37° C. or 60° C. after three months. However, there was discoloration in the electrolyte stored at 85° C. This sample turned yellow by month two and a slightly darker yellow by month three.

The electrolyte samples stored at 60° C. and 85° C. had a higher pH than the samples stored at −35° C. and 37° C. From this, the conclusion was drawn that an increase in temperature results in an increase in pH for electrolyte CAL 22C.

There was no significant change in resistivity for the electrolyte samples stored at −35° C., 37° C. and 60° C. However, the 85° C. sample showed an increase in resistivity over time.

There was no significant difference in the control electrolyte samples compared to the electrolyte samples containing the component pieces of the capacitor.

As shown in FIG. 1 for a representative CAL 22C sample, there was no change in the cyclic voltammetry (CV) scan. The working electrode was a cathode, the counter electrode was platinum and the reference electrode was SCE. The CV scan was run from −2.0 volts to 0.9 volts at a rate of 10 mV/sec.

It was concluded that the physical properties of the CAL 22C electrolyte are not significantly affected at −35° C., 37° C., 60° C. and 85° C. over a three month period. However, there is a slight increase in resistivity and a yellow discoloration at 85° C., but that is typical of ethylene glycol based electrolytes.

EXAMPLE III

Another preferred embodiment of an electrolyte according to the present invention is designated CAL 34A and consists of the ingredients listed in Table 3. This electrolyte is intended for use in activating a 200 volt capacitor.

TABLE 3

| Components | Wt. Percent | Amount |
|---|---|---|
| water | 44.46 | 630 (ml) |
| ethylene glycol | 34.61 | 441 (ml) |
| ammonium acetate | 10.04 | 142 (g) |
| phosphoric acid | 0.51 | 4.2 (ml) |
| acetic acid | 10.39 | 140 (ml) |

It was determined that electrolyte CAL 34A had the physical characteristics listed in Table 4.

TABLE 4

| | |
|---|---|
| pH | 4.87 |
| Conductivity | 29.6 mS/cm |
| Resistivity | 33.8 Ωcm |
| CV Window | 0.7 volts |
| Anode Breakdown | 270 volts |

In order to determine the compatibility of electrolyte CAL 34A with the capacitor, the electrolyte was filled into 22 glass bottles in a similar manner as previously described in Example I.

The capacitor component materials were weighed three times prior to being placed in the appropriate bottles. Each bottle was then filled with electrolyte CAL 34C and the bottles were sealed with aluminum seal caps. Eleven of the bottles were stored at 60° C. while the remaining eleven bottles were stored at 85° C. The capacitor contents of the bottles were rinsed, dried and weighed on a monthly basis for three months.

There was no discoloration in any of the electrolyte samples after storing at 60° C. for three months. However, there was discoloration in the electrolyte stored at 85° C. as the samples were white after three months. The 85° C. electrolyte sample containing the titanium cathode substrate was slightly more yellow in color. Yellow discoloration is a normal characteristic of ethylene glycol based electrolytes that have been stored at 85° C.

The polyethylene machined insulation ring turned tan around the hole in the ring in the sample stored at 85° C.

Most electrolyte samples had less than one percent weight change with the exception of the CELGARD and MasterSil materials. The observed weight changes were attributed to the rinsing and drying process.

It was determined that electrolyte CAL 34A is compatible with the capacitor. The significant weight loss noted in the CELGARD separator materials was determined to be caused by the rinsing process.

EXAMPLE IV

In order to determine the effect various temperatures have on the physical properties of CAL 34A, the electrolyte was filled into eight glass bottles. Specifically, four glass bottles were filled with electrolyte CAL 34A and stored at −35° C., 37° C., 60° C. and 85° C., respectively The samples were tested on a monthly basis for three months for pH, conductivity, voltage breakdown, voltage window and discoloration.

The remaining four glass bottles were filled with electrolyte CAL 34A and pieces of one of the component materials of the capacitor were placed in respective ones of the bottles. The samples were stored at −35° C., 37° C., 60° C. and 85° C. and tested on a monthly basis for pH, conductivity, voltage breakdown, voltage window and discoloration.

There was no discoloration in the samples stored at −35° C., 37° C. or 60° C. after three months. However, there was discoloration in the electrolyte stored at 85° C. This electrolyte turned slightly yellow after the first month.

The electrolyte samples stored at 60° C. and 85° C. had a higher pH than the samples stored at −35° C. and 37° C. From this, the conclusion was drawn that an increase in temperature results in an increase in pH for electrolyte CAL 34A.

There was no significant change in resistivity for the electrolyte samples stored at −35° C., 37° C. and 60° C. However, the 85° C. sample showed an increase in resistivity over time.

There was no significant difference in the control electrolyte samples compared to the electrolyte samples containing the component pieces of the capacitor.

Foil voltage breakdown was consistent throughout the electrolyte samples stored at the various temperatures.

Figure 2:
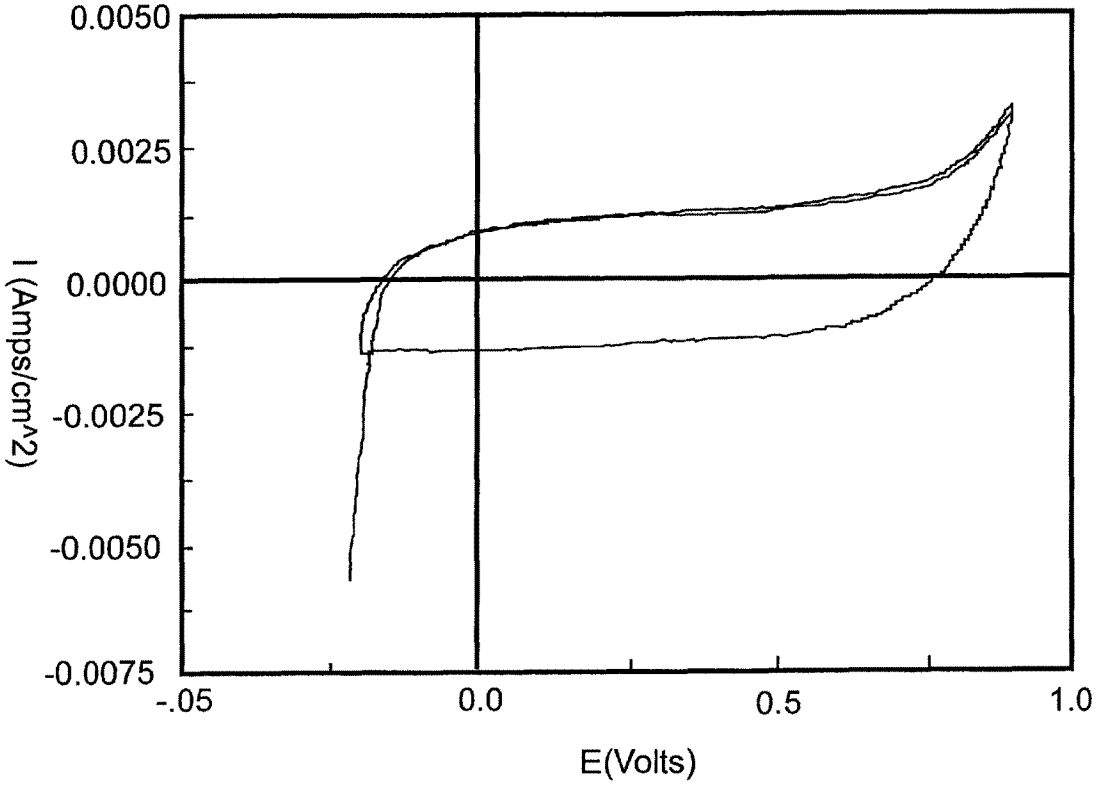

There was no change in cyclic voltammetry scans for the various electrolyte samples. An exemplary CV scan is shown in FIG. 2 and was conducted in a similar manner as described in Example II.

It was concluded that the physical properties of the CAL 34A electrolyte are not significantly affected at −35° C., 37° C., 60° C. and 85° C. over a three month period. However, there is a slight increase in resistivity and a yellow discoloration at 85° C., but that is typical of ethylene glycol based electrolytes.

EXAMPLE V

Another preferred embodiment of an electrolyte according to the present invention is designated LAC 15A and consists of the ingredients listed in Table 5. This electrolyte is intended for use in activating a 250 volt capacitor.

TABLE 5

| Components | Wt. Percent | Amount |
|---|---|---|
| water | 46.52 | 647 (ml) |
| ethylene glycol | 36.05 | 451 (ml) |
| ammonium acetate | 8.29 | 115 (g) |
| phosphoric acid | 0.44 | 3.5 (ml) |
| acetic acid | 8.70 | 115 (ml) |

It was determined that electrolyte LAC 15A had the physical characteristics listed in Table 6

TABLE 6

| | |
|---|---|
| pH | 4.83 |
| Conductivity | 25.6 mS/cm |
| Resistivity | 39.1 Ωcm |
| CV Window | 0.7 volts |
| Anode Breakdown | 275 volts |

Figure 3:
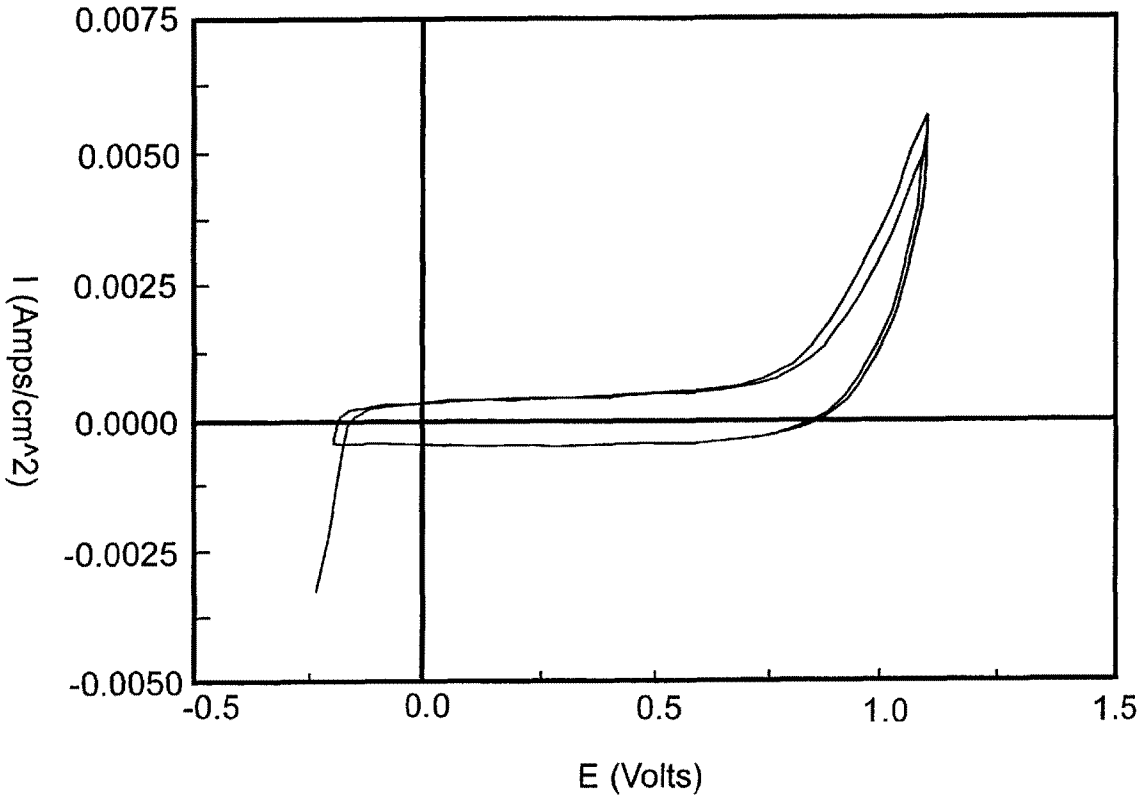

Tests of pH, conductivity, resistivity, cyclic voltammetry scan, and breakdown voltage were performed on LAC 15A. The CV scan was done in a similar manner as described in Example II. As shown in FIG. 3 for a representative LAC 15A sample, the CV window was determined to be 0.70 volts.

The pH of LAC 15A is 4.84, which is in the acceptable pH range. Acetic acid lowers the pH of the electrolyte and was used because it has a higher breakdown voltage than malonic, malic, maleic, citric and succinic acids.

The resistivity of LAC 15A is 39.1 Ωcm. This resistivity meets the requirements for an electrolyte with an ethylene glycol solvent. Ammonium acetate is the solute responsible for lowering the resistivity.

The compatibility of electrolyte CAL 34A with the capacitor was tested in a similar manner as previously described in Example I. LAC 15A was determined to be compatible with all capacitor component materials of the capacitor.

An open cell capacitor was built containing a ruthenium oxide cathode and a sintered tantalum anode segregated from each other by a CELGARD 5550 separator and activated with LAC 15A. From this test it was determined that the cell resistivity was 639.34 Ωm, which is below the 1.0 Ω requirement. Additionally, charge/discharge data showed that the cell will withstand 280 volts, which is above the breakdown voltage requirement of 275 volts.

The dc leakage of the open cell after 5 minutes at 24 μamps was determined to be an acceptable value. The dc leakage of an open cell is typically higher than in a closed capacitor.

Long term testing of this electrolyte was performed at temperatures of −35° C., room temperature, 60° C. and 85° C. Low temperature testing of LAC 15A showed that LAC 15A is liquid at −35° C. which meets the low temperature requirement for the electrolyte. Also, LAC 15A was stable after seven months at −35° C. in terms of both pH and resistivity.

The greatest change in pH occurred at 60° C. That sample had a 0.25 increase in pH, which is not detrimental to the performance of the electrolyte as it falls in the acceptable pH range of 1 to 7. The pH of LAC 15A stored at all temperatures leveled off at approximately 5.0.

There was a slight increase in resistivity in LAC 15A at all storage temperatures. The greatest increase in resistivity was observed in the electrolyte stored at 85° C. The maximum resistivity was 41.8 Ωcm.

Accordingly, it was determined that electrolyte LAC 15A is useful as an electrolyte for a 250 volt capacitor. It has a breakdown voltage of 275 volts, a pH of 4.84 and a CV window of 0.7 volts. The electrolyte performs well at high temperatures with no gas generation nor significant changes in pH and resistivity. The freezing point is well below the acceptable limit of −30° C. It is compatible with all materials in the capacitor. The resistivity is acceptable at 39.1 Ωcm. It performed well in both an open cell capacitor and a prototype ruthenium oxide/tantalum capacitor in terms of resistivity, charge/discharge, and do leakage tests. Finally, long term testing at elevated temperatures indicated that LAC 15A is a stable electrolyte which changes little in terms of its physical or functional properties.

EXAMPLE VI

Another preferred embodiment of an electrolyte according to the present invention is designated LAC 38I and consists of the ingredients listed in Table 7. This electrolyte is intended for use in activating a 250 volt capacitor.

TABLE 7

| Components | Wt. Percent | Amount |
|---|---|---|
| water | 46.59 | 650 (ml) |
| ethylene glycol | 41.45 | 520 (ml) |
| ammonium acetate | 5.60 | 78 (g) |
| phosphoric acid | 0.48 | 3.9 (ml) |
| acetic acid | 5.88 | 78 (ml) |

It was determined that electrolyte LAC 38I had the physical characteristics listed in Table 8.

TABLE 8

| | |
|---|---|
| pH | 4.80 |
| Conductivity | 18.8 mS/cm |
| Resistivity | 53.3 Ωcm |
| Foil Breakdown | 270 volts |
| CV Window | 0.7 volts |
| Anode Breakdown | 300 volts |

LAC 38I was tested at a temperature of 24.5° C. for: conductivity, resistivity, pH, foil breakdown voltage and CV window. LAC 38I was also subjected to −38° C. for one week at a volume of approximately 80 mL. The CV scan was run in a similar manner as described in Example II.

Compatibility testing was performed on LAC 38I. This test consisted of filling the electrolyte into 22 glass bottles in a similar manner as described in Example I. The bottles were monitored monthly for color and each capacitor component material was rinsed, dried and weighed. No apparent change in electrolyte composition based on color and clarity were detected.

Figure 4:
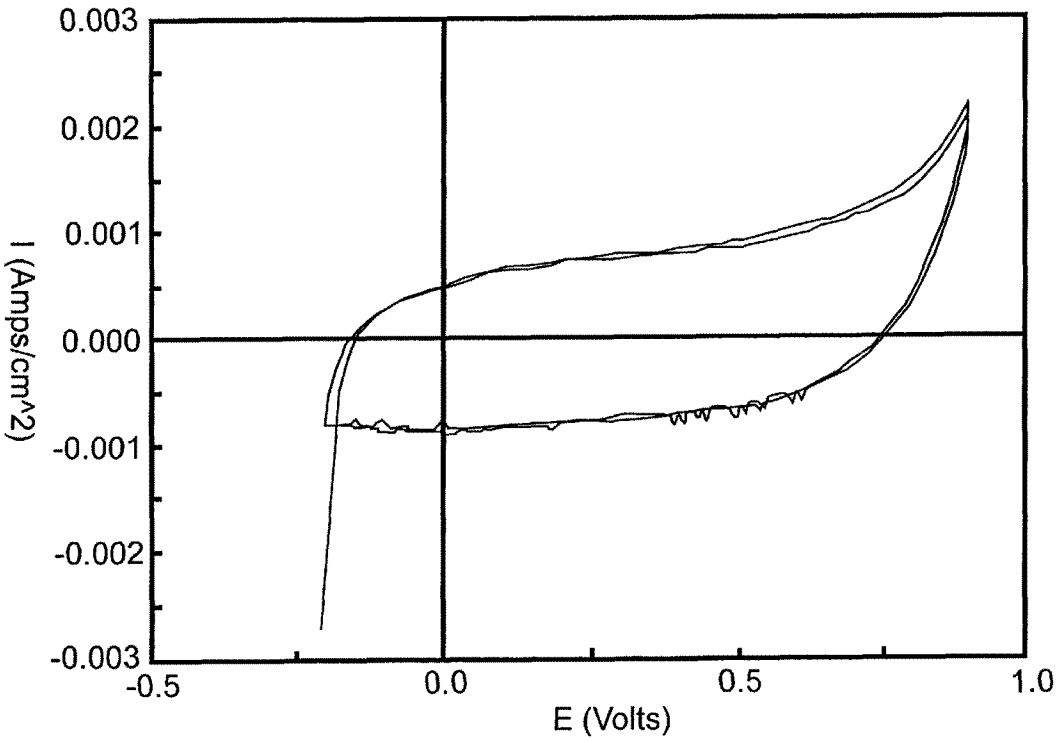

An open cell capacitor was built in a similar manner to the open cell capacitor described in Example VI, and activated with LAC 38I. It was determined that LAC 38I met the pH, CV window (FIG. 4), low temperature, and breakdown requirements for the 250 volt capacitor. The resistivity cf LAC 38I was 54.4 Ωcm, which is higher than the resistivity of LAC 15A at 39.1 Ωcm. The higher resistivity of LAC 38I means that the Rs is higher and the energy efficiency is lower in comparison to the open cell activated with LAC 15A. The tradeoff is that LAC 38I has a breakdown voltage that is 25 volts higher than LAC 15A.

LAC 38I was subjected to a three month temperature test at 37° C., 60° C., 85° C., and −35° C. The test bottles contained LAC 38I and the component materials of the capacitor while a control bottle contained only the electrolyte. Both the control and test samples of LAC 38I were tested monthly for pH, conductivity, resistivity, foil breakdown voltage and color. The results of the three month temperature test were similar to those for LAC 15A. There were no significant differences between the control and the test samples. At −35° C., the various tested properties remained the same over the three month period. At 37° C., 60° C. and 85° C., the pH and resistivity increased slightly with time. The foil breakdown voltage remained unaffected. The electrolyte color changed at 85° C. in the control bottle, but it is common for ethylene glycol based electrolytes to turn yellow at elevated temperatures. The yellow color is not an indication of an unstable electrolyte.

Accordingly, LAC 38I is an alternative choice for an electrolyte in a 250 volt capacitor. The electrolyte meets the pH, CV window, low temperature and breakdown requirements for the capacitor. No compatibility problems were identified between LAC 38I and the components used in the capacitor and long term testing showed that the electrolyte is stable.

EXAMPLE VII

Another embodiment of an electrolyte according to the present invention is designated CAL 23H and consists of the ingredients listed in Table 9. This electrolyte is intended for use in activating a 300 volt capacitor.

TABLE 9

| Components | Wt. Percent | Amount |
|---|---|---|
| water | 51.94 | 720 (ml) |
| ethylene glycol | 40.29 | 502 (ml) |
| ammonium acetate | 3.54 | 50 (g) |
| phosphoric acid | 0.59 | 4.8 (ml) |
| acetic acid | 3.64 | 48 (ml) |

It was determined that electrolyte CAL 23H had the physical characteristics listed in Table 10.

TABLE 10

| | |
|---|---|
| pH | 4.70 |
| Conductivity | 13.7 mS/cm |
| Resistivity | 72.8 Ωcm |
| Foil Breakdown | 250 volts |
| CV Window | 0.7 volts |
| Anode Breakdown | 320 volts |

An open cell capacitor was built in a similar manner as the open cell described in Example VI and activated with CAL 23H. The open cell capacitor was tested for capacitance, resistance, dc leakage and charge/discharge performance.

Figure 5:
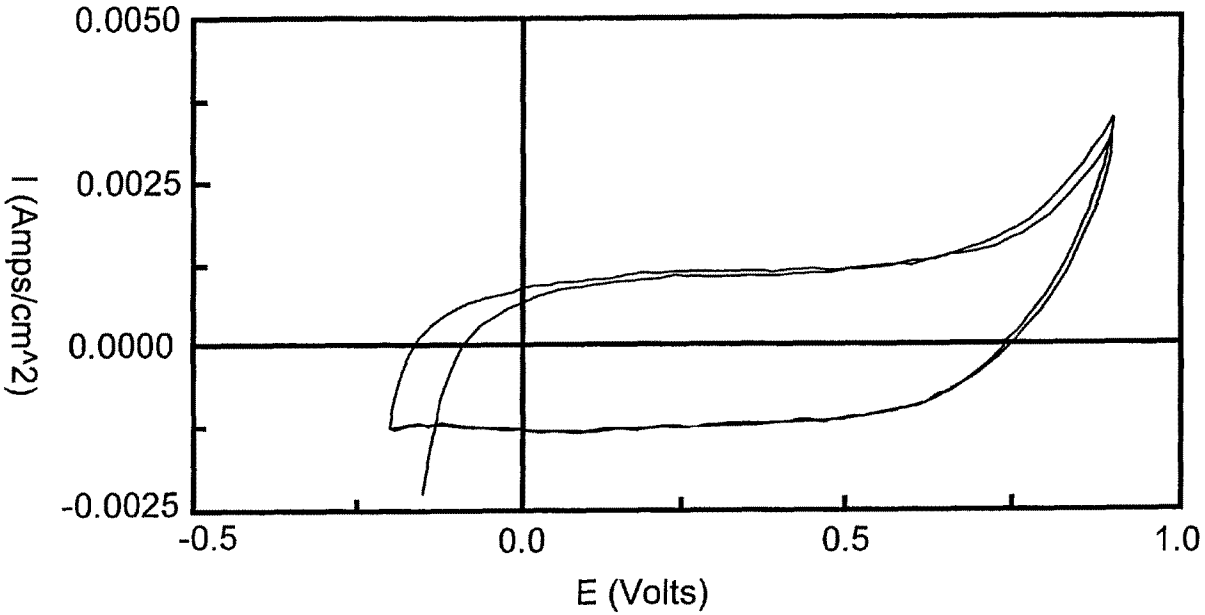

The pH, conductivity, and CV window met the criteria for the 300 volt electrolyte. The pH was less than 8 and the CV window was below the 0.7 volt minimum (FIG. 5).

The open cell capacitor had a breakdown voltage of 320 volts which is above the minimum 15 volts charge guard-band.

A sample of the CAL 23H electrolyte remained liquid at −38° C. after 24 hours.

The resistivity of the electrolyte was stable after 26 days at 60° C. and 85° C.

There was an increase in pH at 60° C. and 85° C., which is a normal characteristic of electrolytes containing water, ethylene glycol, ammonium acetate, acetic acid and phosphoric acid.

Accordingly, it was determined that CAL 23H meets the 300 volt electrolyte criteria.

It is appreciated that various modifications to the present inventive concepts described herein may be apparent to those of ordinary skill in the art without departing from the spirit and scope of the present invention as defined by the herein appended claims.

What is claimed is:

[1. An electrolyte for an electrochemical energy storage device, the electrolyte consisting essentially of:

a) a mixed solvent of water and at least one second solvent selected from the group consisting of ethylene glycol, polyethylene glycol, formamide, dimethyl formamide, γ-butyrolactone, and mixtures thereof, wherein the water is present, by weight, up to about 85% and the second solvent is present, by weight, up to about 95%;

b) an ammonium salt dissolved in the mixed solvent; and c) an acid.]

[2. The electrolyte of claim 1 wherein the ammonium salt is selected from the group consisting of ammonium acetate, ammonium formate, ammonium hydrogen maleate, ammonium hydrogen phosphate, and mixtures thereof.]

[3. The electrolyte of claim 1 wherein the acid is selected from the group consisting of citric acid, oxalic acid, formic acid, maleic acid, phosphoric acid, malonic acid, maltic acid, sulfuric acid, adipic acid, succinic acid, nitric acid, acetic acid, and mixtures thereof.]

[4. The electrolyte of claim 1 having a pH between about 1 to about 7.]

[5. An electrolyte for a capacitor, the electrolyte comprising:

a) a mixed solvent of water and ethylene glycol, wherein the water is present, by weight, up to about 85% and the ethylene glycol is present, by weight, up to about 95%;

b) a solute of ammonium acetate; and c) a mixed acid of acetic acid and phosphoric acid.]

[6. The electrolyte of claim 5 wherein the ammonium acetate is present, by weight, up to about 50%.]

[7. The electrolyte of claim 5 wherein the acetic acid is present, by weight, up to about 80% and the phosphoric acid is present, by weight, up to about 6%.]

[8. The electrolyte of claim 5 wherein the capacitor comprises a ruthenium oxide cathode and a tantalum anode.]

[9. The electrolyte of claim 8 wherein the ruthenium oxide is provide on a titanium substrate.]

[10. A capacitor, which comprises:

a) an anode of a valve metal;

b) a cathode of ruthenium oxide; and c) an electrolyte activating the anode and the cathode, the electrolyte comprising:

i) a mixed solvent of water and ethylene glycol, wherein the water is present, by weight, up to about 85% and the ethylene glycol is present, by weight, up to about 95%;

ii) an ammonium salt dissolved in the solvent; and iii) an acid.]

[11. The capacitor of claim 10 including providing the electrolyte having ammonium acetate up to about 50%, by weight.]

[12. The capacitor of claim 10 including providing the electrolyte having acetic acid up to about 80%, by weight, and phosphoric acid up to about 6%, by weight.]

[13. The capacitor of claim 10 comprising a ruthenium oxide cathode and a tantalum anode.]

[14. The capacitor of claim 10 wherein the ruthenium oxide is provide on a titanium substrate.]

[15. The capacitor of claim 10 wherein the electrolyte includes, by weight, about 49.41% de-ionized water, about 19.45% ethylene glycol, about 15.55% ammonium acetate, about 0.31% phosphoric acid and about 15.28% acetic acid.]

[16. The capacitor of claim 15 rated to about 175 volts.]

[17. The capacitor of claim 10 wherein the electrolyte includes, by weight, about 44.46% de-ionized water, about 34.61% ethylene glycol, about 10.04% ammonium acetate, about 0,51% phosphoric acid and about 10.39% acetic acid.]

[18. The capacitor of claim 17 rated to about 200 volts.]

[19. The capacitor of claim 10 wherein the electrolyte includes, by weight, about 46.52% de-ionized water, about 36.05% ethylene glycol, about 8.29% ammonium acetate, about 0.44% phosphoric acid and about 8.70% acetic acid.]

[20. The capacitor of claim 19 rated to about 250 volts.]

[21. The capacitor of claim 10 wherein the electrolyte includes, by weight, about 46.59% de-ionized water, about 41.45% ethylene glycol, about 5.60% ammonium acetate, about 0.48% phosphoric acid and about 5.88% acetic acid.]

[22. The capacitor of claim 21 rated to about 250 volts.]

[23. The capacitor of claim 10 wherein the electrolyte includes, by weight, about 51.94% de-ionized water, about 40.29% ethylene glycol, about 3.54% ammonium acetate, about 0.59% phosphoric acid and about 3.64% acetic acid.]

[24. The capacitor of claim 23 rated to about 300 volts.]

[25. A method for providing an electrolyte, consisting essentially of the steps of:

a) mixing water and ethylene glycol to provide a solvent mixture, wherein the water is present, by weight, up to about 85% and the second solvent is present by weight, up to about 95%;

b) dissolving an ammonium salt in the solvent mixture; and c) providing an acid in the solvent mixture.]

[26. The method of claim 25 including selecting the ammonium salt from the group consisting of ammonium acetate, ammonium formate, ammonium hydrogen maleate, ammonium hydrogen phosphate, and mixtures thereof.]

[27. The method of claim 25 including selecting the acid from the group consisting of citric acid, oxalic acid, formic acid, maleic acid, phosphoric acid, malonic acid, maltic acid, sulfuric acid, adipic acid, succinic acid, nitric acid, acetic acid, and mixtures thereof.]

[28. A method for providing a capacitor, comprising the steps of:

a) providing an anode of tantalum;

b) providing a cathode of ruthenium oxide; and c) activating the anode and the cathode with an electrolyte, the electrolyte comprising:

i) a mixed solvent of water and ethylene glycol, wherein the water is present, by weight, up to about 85% and the ethylene glycol is present, by weight, up to about 95%;

ii) an ammonium salt dissolved in the solvent; and iii) an acid.]

[29. The method of claim 28 including providing the electrolyte having ammonium acetate present, by weight, up to about 50%.]

[30. The method of claim 28 including providing the electrolyte having acetic acid present, by weight, up to about 80% and phosphoric acid present, by weight, up to about 6%.]

[31. The method of claim 28 comprising a ruthenium oxide cathode and a tantalum anode.]

[32. The method of claim 28 wherein the ruthenium oxide is provided on a titanium substrate.]

33. An electrolyte for [activating] a capacitor, the electrolyte consisting [essentially] of:

a) a mixed solvent of water and ethylene glycol;

b) a solute of ammonium acetate present, by weight, up to about 50%; and c) a mixed acid of acetic acid and phosphoric acid.

34. An electrolyte for [activating] a capacitor, the electrolyte consisting [essentially] of:

a) a mixed solvent of water and ethylene glycol;

b) a solute of ammonium acetate; and c) a mixed acid of acetic acid and phosphoric acid, wherein the acetic acid is present, by weight, up to about 80% and the phosphoric acid is present, by weight, up to about 6%.

[35. A capacitor, which comprises:

a) an anode of a valve metal;

b) a cathode of ruthenium oxide; and c) an electrolyte activating the anode and the cathode, the electrolyte comprising:

i) a mixed solvent of water and ethylene glycol;

ii) an ammonium salt dissolved in the solvent, wherein the ammonium salt is ammonium acetate present in the electrolyte at a concentration up to about 50%, by weight; and iii) an acid.]

[36. A capacitor, which comprises:

a) an anode of a valve metal;

b) a cathode of ruthenium oxide; and c) an electrolyte activating the anode and the cathode, the electrolyte comprising:

i) a mixed solvent of water and ethylene glycol;

ii) an ammonium salt dissolved in the solvent; and iii) a mixed acid of acetic acid and phosphoric acid, wherein the acetic acid is present at a concentration up to about 80%, by weight, and phosphoric acid is present at a concentration up to about 6%, by weight.]

[37. A capacitor, which comprises:

a) an anode of a valve metal;

b) a cathode of ruthenium oxide; and c) an electrolyte activating the anode and the cathode, the electrolyte comprising, by weight, about 49.41% deionized water, about 19.45% ethylene glycol, about 15.55% ammonium acetate, about 0.31% phosphoric acid and about 15.28% acetic acid.]

[38. The capacitor of claim 37 rated to about 175 volts.]

[39. A capacitor, which comprises:

a) an anode of a valve metal;

b) a cathode of ruthenium oxide; and c) an electrolyte activating the anode and the cathode, the electrolyte comprising, by weight, about 44.46% deionized water, about 34.61% ethylene glycol, about 10.04% ammonium acetate, about 0.51% phosphoric acid and about 10.39% acetic acid.]

[40. The capacitor of claim 39 rated to about 200 volts.]

[41. A capacitor, which comprises:

a) an anode of a valve metal;

b) a cathode of ruthenium oxide; and c) an electrolyte activating the anode and the cathode, the electrolyte comprising, by weight, about 46.52% deionized water, about 36.05% ethylene glycol, about 8.29% ammonium acetate, about 0.44% phosphoric acid and about 8.70% acetic acid.]

[42. The capacitor of claim 41 rated to about 250 volts.]

[43. A capacitor, which comprises:

a) an anode of a valve metal;

b) a cathode of ruthenium oxide; and c) an electrolyte activating the anode and the cathode, the electrolyte comprising, by weight, about 46.59% deionized water, about 41.45% ethylene glycol, about 5.60% ammonium acetate, about 0.48% phosphoric acid and about 5.88% acetic acid.]

[44. The capacitor of claim 43 rated to about 250 volts.]

[45. A capacitor, which comprises:

a) an anode of a valve metal;

b) a cathode of ruthenium oxide; and c) an electrolyte activating the anode and the cathode, the electrolyte comprising, by weight, about 51.94% deionized water, about 40.29% ethylene glycol, about 3.54% ammonium acetate, about 0.59% phosphoric acid and about 3.64% acetic acid.]

[46. The capacitor of claim 45 rated to about 300 volts.]

[47. A method for providing a capacitor, comprising the steps of:

a) providing an anode of tantalum;

b) providing a cathode of ruthenium oxide; and c) activating the anode and the cathode with an electrolyte, the electrolyte comprising:

i) a mixed solvent of water and ethylene glycol;

ii) an ammonium salt dissolved in the solvent, wherein the ammonium salt is ammonium acetate present, by weight, up to about 50%; and iii) an acid.]

[48. A method for providing a capacitor, comprising the steps of:

a) providing an anode of tantalum;

b) providing a cathode of ruthenium oxide; and c) activating the anode and the cathode with an electrolyte, the electrolyte comprising:

i) a mixed solvent of water and ethylene glycol;

ii) an ammonium salt dissolved in the solvent; and iii) a mixed acid of acetic acid and phosphoric acid, wherein the acetic acid is present at a concentration up to about 80%, by weight, and the phosphoric acid is present at a concentration up to about 6%, by weight.]

*49. The electrolyte of claim 33, having a conductivity in the range of 13.7 to 47.5 mS/cm.*

*50. The electrolyte of claim 33, having a resistivity in the range of 21.0 to 72.8 Ωcm.*

*51. The electrolyte of claim 33, having an anode breakdown voltage in the range of 245 to 320 volts when the breakdown voltage is measured using a tantalum anode.*

*52. The electrolyte of claim 51, wherein the anode breakdown voltage is measured when the electrolyte is at an operating temperature.*

*53. The electrolyte of claim 33, wherein the electrolyte has:*

*a) a conductivity in a range of 29.6 to 47.5 mS/cm; and*

*b) an anode breakdown voltage in a range of 245 to 270 volts when the breakdown voltage is measured using a tantalum anode.*

*54. The electrolyte of claim 53, wherein the anode breakdown voltage is measured when the electrolyte is at an operating temperature.*

*55. The electrolyte of claim 53, having a pH in a range of 4.87 to 4.89.*

*56. The electrolyte of claim 53, having a resistivity in a range of 21.0 to 33.8 Ωcm.*

*57. The electrolyte of claim 53, wherein the electrolyte does not generate gas at 85° C.*

*58. The electrolyte of claim 33, wherein the electrolyte has:*

*a) a conductivity in a range of 25.6 to 29.6 mS/cm; and*

*b) an anode breakdown voltage in a range of 270 to 275 volts when the breakdown voltage is measured using a tantalum anode.*

*59. The electrolyte of claim 58, wherein the anode breakdown voltage is measured when the electrolyte is at an operating temperature.*

*60. The electrolyte of claim 58, having a pH in a range of 4.83 to 4.87.*

*61. The electrolyte of claim 58, having a resistivity in a range of 33.8 to 39.1 Ωcm.*

*62. The electrolyte of claim 58, wherein the electrolyte does not generate gas at 85° C.*

*63. The electrolyte of claim 33, wherein the electrolyte has:*

*a) a conductivity in a range of 18.8 to 25.6 mS/cm; and*

*b) an anode breakdown voltage in a range of 275 to 300 volts when the breakdown voltage is measured using a tantalum anode.*

*64. The electrolyte of claim 63, wherein the anode breakdown voltage is measured when the electrolyte is at an operating temperature.*

*65. The electrolyte of claim 63, having a pH in a range of 4.80 to 4.83.*

*66. The electrolyte of claim 63, having a resistivity in a range of 39.1 to 53.3 Ωcm.*

*67. The electrolyte of claim 63, wherein the electrolyte does not generate gas at 85° C.*

*68. The electrolyte of claim 33, wherein the electrolyte has:*

*a) a conductivity in a range of 13.7 to 18.8 mS/cm; and*

*b) an anode breakdown voltage in a range of 300 to 320 volts when the breakdown voltage is measured using a tantalum anode.*

*69. The electrolyte of claim 68, wherein the anode breakdown voltage is measured when the electrolyte is at an operating temperature.*

*70. The electrolyte of claim 68, having a pH in a range of 4.70 to 4.80.*

*71. The electrolyte of claim 68, having a resistivity in a range of 53.3 to 72.8 Ωcm.*

*72. The electrolyte of claim 68, wherein the electrolyte does not generate gas at 85° C.*

*73. The electrolyte of claim 33, wherein the electrolyte has:*

*a) a pH in a range of about 3 to 6;*

*b) a resistivity in a range of 21.0 to 72.8 Ωcm; and*

*c) an anode breakdown voltage in the range of 245 to 320 volts when the anode breakdown voltage is measured using a tantalum anode.*

*74. The electrolyte of claim 73, wherein the electrolyte has said pH and said resistivity when the electrolyte is at an operating temperature.*

*75. The electrolyte of claim 33, wherein:*

*a) water is in the range of about 44.46% to about 51.94%, by weight;*

*b) ethylene glycol is in the range of about 19.45% to about 41.45%, by weight;*

*c) ammonium acetate is in the range of about 3.54% to about 15.55%, by weight;*

*d) acetic acid is in the range of about 3.64% to about 15.28%, by weight; and*

*e) phosphoric acid is in the range of about 0.31% to about 0.59%, by weight.*

*76. The electrolyte of claim 75, wherein the electrolyte has a pH in a range of 4.7 to 4.89.*

*77. The electrolyte of claim 75, wherein the electrolyte has a conductivity in a range of 13.7 mS/cm to 47.5 mS/cm.*

*78. The electrolyte of claim 75, wherein the electrolyte has a resistivity in a range of 21.0 to 72.8 Ωcm.*

*79. The electrolyte of claim 75, wherein the electrolyte does not generate gas at 85° C.*

*80. An electrolyte for a capacitor comprising a tantalum anode, the electrolyte consisting of:*

*a) a mixed solvent of water and ethylene glycol;*

*b) a solute of ammonium acetate; and*

*c) a mixed acid of acetic acid and phosphoric acid, wherein:*

*i) water is in a range of about 44.46% to about 51.94%, by weight;*

*ii) ethylene glycol is in a range of about 19.45% to about 41.45%, by weight;*

*iii) ammonium acetate is in a range of about 3.54% to about 15.55%, by weight;*

*iv) phosphoric acid is in a range of about 0.31% to about 0.59%, by weight; and*

*v) acetic acid is in a range of about 3.64% to about 15.28%, by weight.*

*81. A capacitor, which comprises:*

*a) an anode comprising tantalum;*

*b) a cathode of ruthenium oxide; and*

*c) an electrolyte contacting the anode and the cathode, the electrolyte consisting of:*

*i) a mixed solvent of water and ethylene glycol, wherein the water is present, by weight, up to about 85% and the ethylene glycol is present, by weight, up to about 95%;*

*ii) a solute of ammonium acetate present, by weight, up to about 50%; and*

*iii) a mixed acid of acetic acid and phosphoric acid, wherein the acetic acid is present, by weight, up to about 80% and the phosphoric acid is present, by weight, up to about 6%.*

*82. The capacitor of claim 81, wherein the electrolyte has a pH between about 1 to about 7.*

*83. The capacitor of claim 81, wherein the electrolyte has a conductivity in the range of 13.7 to 47.5 mS/cm.*

*84. The capacitor of claim 81, wherein the electrolyte has a resistivity in the range of 21.0 to 72.8 Ωcm.*

*85. The capacitor of claim 81, wherein the electrolyte has an anode breakdown voltage in the range of 245 to 320 volts when the breakdown voltage is measured using a tantalum anode.*

*86. The capacitor of claim 85, wherein the anode breakdown voltage is measured when the electrolyte is at an operating temperature.*

87. The capacitor of claim 81, wherein the electrolyte has:
a) a conductivity in a range of 29.6 to 47.5 mS/cm; and
b) an anode breakdown voltage in a range of 245 to 270 volts when the breakdown voltage is measured using a tantalum anode.

88. The capacitor of claim 87, wherein in the electrolyte, the anode breakdown voltage is measured when the electrolyte is at an operating temperature.

89. The capacitor of claim 87, wherein the electrolyte has a pH in a range of 4.87 to 4.89.

90. The capacitor of claim 87, wherein the electrolyte has a resistivity in a range of 21.0 to 33.8 Ωcm.

91. The capacitor of claim 87, wherein the electrolyte does not generate gas at 85° C.

92. The capacitor of claim 81, wherein the electrolyte has:
a) a conductivity in a range of 25.6 to 29.6 mS/cm; and
b) an anode breakdown voltage in a range of 270 to 275 volts when the breakdown voltage is measured using a tantalum anode.

93. The capacitor of claim 82, wherein in the electrolyte, the anode breakdown voltage is measured when the electrolyte is at an operating temperature.

94. The capacitor of claim 82, wherein the electrolyte has a pH in a range of 4.83 to 4.87.

95. The capacitor of claim 82, wherein the electrolyte has a resistivity in a range of 33.8 to 39.1 Ωcm.

96. The capacitor of claim 82, wherein the electrolyte does not generate gas at 85° C.

97. The capacitor of claim 81, wherein the electrolyte has:
a) a conductivity in a range of 18.8 to 25.6 mS/cm; and
b) an anode breakdown voltage in a range of 275 to 300 volts when the breakdown voltage is measured using a tantalum anode.

98. The capacitor of claim 97, wherein in the electrolyte, the anode breakdown voltage is measured when the electrolyte is at an operating temperature.

99. The capacitor of claim 97, wherein the electrolyte has a pH in a range of 4.80 to 4.83.

100. The capacitor of claim 97, wherein the electrolyte has a resistivity in a range of 39.1 to 53.3 Ωcm.

101. The capacitor of claim 97, wherein the electrolyte does not generate gas at 85° C.

102. The capacitor of claim 81, wherein the electrolyte has:
a) a conductivity in a range of 13.7 to 18.8 mS/cm; and
b) an anode breakdown voltage in a range of 300 to 320 volts when the breakdown voltage is measured using a tantalum anode.

103. The capacitor of claim 102, wherein in the electrolyte, the anode breakdown voltage is measured when the electrolyte is at an operating temperature.

104. The capacitor of claim 102, wherein the electrolyte has a pH in a range of 4.70 to 4.80.

105. The capacitor of claim 102, wherein the electrolyte has a resistivity in a range of 53.3 to 72.8 Ωcm.

106. The capacitor of claim 102, wherein the electrolyte does not generate gas at 85° C.

107. The capacitor of claim 81, wherein the electrolyte has:
a) a pH in a range of about 3 to 6, a resistivity in a range of 21.0 to 72.8 Ωcm, and an anode breakdown voltage in the range of 245 to 320 volts; and
b) the anode breakdown voltage is measured using a tantalum anode.

108. The capacitor of claim 107, wherein the electrolyte has said pH and said resistivity when the electrolyte is at an operating temperature.

109. The capacitor of claim 81, wherein in the electrolyte:
a) water is in the range of about 44.46% to about 51.94%, by weight;
b) ethylene glycol is in the range of about 19.45% to about 41.45%, by weight;
c) ammonium acetate is in the range of about 3.54% to about 15.55%, by weight;
d) acetic acid is in the range of about 3.64% to about 15.28%, by weight; and
e) phosphoric acid is in the range of about 0.31% to about 0.59%, by weight.

110. The capacitor of claim 109, wherein the electrolyte has a pH in a range of 4.7 to 4.89.

111. The capacitor of claim 109, wherein the electrolyte has a conductivity in a range of 13.7 mS/cm to 47.5 mS/cm.

112. The capacitor of claim 109, wherein the electrolyte has a resistivity in a range of 21.0 to 72.8 Ωcm.

113. The capacitor of claim 109, wherein the electrolyte does not generate gas at 85° C.

114. The electrolyte of claim 33, having a pH between about 1 to about 7.

115. A capacitor, which comprises:
a) an anode of tantalum;
b) a cathode of ruthenium oxide; and
c) an electrolyte contacting the anode and the cathode, the electrolyte consisting of:
i) a mixed solvent of water and ethylene glycol;
ii) a solute of ammonium acetate present, by weight, up to about 50%; and
iii) a mixed acid of acetic acid and phosphoric acid.

116. A capacitor, which comprises:
a) an anode of tantalum;
b) a cathode of ruthenium oxide; and
c) an electrolyte contacting the anode and the cathode, the electrolyte consisting of:
i) a mixed solvent of water and ethylene glycol;
ii) a solute of ammonium acetate; and
iii) a mixed acid of acetic acid and phosphoric acid, wherein the acetic acid is present at a concentration up to about 80%, by weight, and phosphoric acid is present at a concentration up to about 6%, by weight.

117. A method for providing a capacitor, comprising the steps of:
a) providing an anode of tantalum;
b) providing a cathode of ruthenium oxide; and
c) contacting the anode and the cathode with an electrolyte, the electrolyte consisting of:
i) a mixed solvent of water and ethylene glycol;
ii) a solute of ammonium acetate present, by weight, up to about 50%; and
iii) a mixed acid of acetic acid and phosphoric acid.

118. A method for providing a capacitor, comprising the steps of:
a) providing an anode of tantalum;
b) providing a cathode of ruthenium oxide; and
c) contacting the anode and the cathode with an electrolyte, the electrolyte consisting of:
i) a mixed solvent of water and ethylene glycol;
ii) a solute of ammonium acetate; and
iii) a mixed acid of acetic acid and phosphoric acid, wherein the acetic acid is present at a concentration up to about 80%, by weight, and the phosphoric acid is present at a concentration up to about 6%, by weight.

* * * * *